(12) United States Patent
Paluncic et al.

(10) Patent No.: US 8,920,037 B2
(45) Date of Patent: Dec. 30, 2014

(54) BEARING ARRANGEMENT AND METERING VALVE AND SUCTION DEVICE THEREFOR

(75) Inventors: Zdravko Paluncic, Ludwigshafen (DE); Ralf Trinkel, Gerolsheim (DE)

(73) Assignee: Lincoln GmbH, Walldorf (DE)

(*) Notice: Subject to any disclaimer, the term of this patent is extended or adjusted under 35 U.S.C. 154(b) by 1479 days.

(21) Appl. No.: 12/301,836

(22) PCT Filed: May 18, 2007

(86) PCT No.: PCT/EP2007/004462
§ 371 (c)(1),
(2), (4) Date: May 19, 2010

(87) PCT Pub. No.: WO2007/134815
PCT Pub. Date: Nov. 29, 2007

(65) Prior Publication Data
US 2010/0322543 A1  Dec. 23, 2010

(30) Foreign Application Priority Data

| May 23, 2006 | (DE) | 20 2006 008 288 U |
| Jul. 19, 2006 | (DE) | 20 2006 011 249 U |
| Apr. 10, 2007 | (DE) | 20 2007 005 273 U |

(51) Int. Cl.
| F16C 19/00 | (2006.01) |
| F16C 33/66 | (2006.01) |
| F03D 11/00 | (2006.01) |
| F16C 19/18 | (2006.01) |
| F16N 25/02 | (2006.01) |

(52) U.S. Cl.
CPC ........ *F16C 33/6674* (2013.01); *F03D 11/0008* (2013.01); *F16C 19/18* (2013.01); *F16C 33/6622* (2013.01); *F16C 33/6685* (2013.01); *F16N 25/02* (2013.01); *F16C 2300/14* (2013.01); *F16N 2210/02* (2013.01); *F16N 2210/14* (2013.01); *Y02B 10/30* (2013.01); *Y02E 10/722* (2013.01)
USPC ............................ 384/471; 384/466; 384/475

(58) Field of Classification Search
CPC ............. F16C 33/6659; F16C 33/6674; F16C 33/6677; F16C 33/6685
USPC ......... 384/473, 462, 466, 468, 471, 474, 475; 184/7.4, 8, 9
See application file for complete search history.

(56) References Cited

U.S. PATENT DOCUMENTS

| 2,867,481 A * | 1/1959 | Hornbostel .................. 384/466 |
| 3,195,965 A | 7/1965 | Van Dorn |

(Continued)

FOREIGN PATENT DOCUMENTS

| EP | 1471301 A2 | 10/2004 |
| EP | 1712829 A2 | 10/2006 |

(Continued)

OTHER PUBLICATIONS

International Report on Patentability dated Nov. 27, 2008 regarding PCT/EP2007/004462, 14 pages.

*Primary Examiner* — Richard W Ridley
*Assistant Examiner* — Yamilka Pinero Medina
(74) *Attorney, Agent, or Firm* — Senniger Powers LLP

(57) ABSTRACT

The invention relates to a bearing arrangement with an outer ring and an inner ring that can rotate relative to one another, and rolling bodies, especially balls, which are located between the outer ring and the inner ring. The invention also relates to an infeed distributor and a suction exhaust device for incorporation in such a bearing arrangement.

7 Claims, 11 Drawing Sheets

(56) References Cited

U.S. PATENT DOCUMENTS

| | | | |
|---|---|---|---|
| 3,314,735 A | | 4/1967 | Kocian |
| 3,722,967 A | | 3/1973 | Lewis |
| 3,951,480 A | * | 4/1976 | Nicholson ............... 384/473 |
| 3,958,725 A | * | 5/1976 | Reeve ...................... 222/335 |
| 4,759,427 A | | 7/1988 | Onose |
| 4,886,144 A | * | 12/1989 | Wengeler ................ 184/45.1 |
| 5,147,016 A | * | 9/1992 | Antila ........................ 184/7.4 |
| 5,293,959 A | * | 3/1994 | Kimberlin ................ 184/6.14 |
| 5,711,615 A | | 1/1998 | Stitz |
| 6,261,003 B1 | | 7/2001 | Dusserre-Telmon |
| 2005/0252722 A1 | | 11/2005 | Kosugi |
| 2007/0177835 A1 | * | 8/2007 | Verhaegen ................ 384/462 |
| 2009/0148088 A1 | * | 6/2009 | Sasabe et al. ............. 384/467 |

FOREIGN PATENT DOCUMENTS

| | | | | |
|---|---|---|---|---|
| GB | 2201200 A | | 8/1988 | |
| JP | 02080815 A | * | 3/1990 | ............ F16C 33/66 |
| JP | 02195020 A | * | 8/1990 | ............ F16C 33/66 |
| JP | 11280771 A | | 10/1999 | |
| JP | 2007024256 | * | 2/2007 | ............ F16C 33/66 |
| TW | 281719 | | 7/1996 | |
| TW | 200402512 | | 2/2004 | |
| TW | 1238879 | | 9/2005 | |
| WO | 0163132 A2 | | 8/2001 | |

* cited by examiner

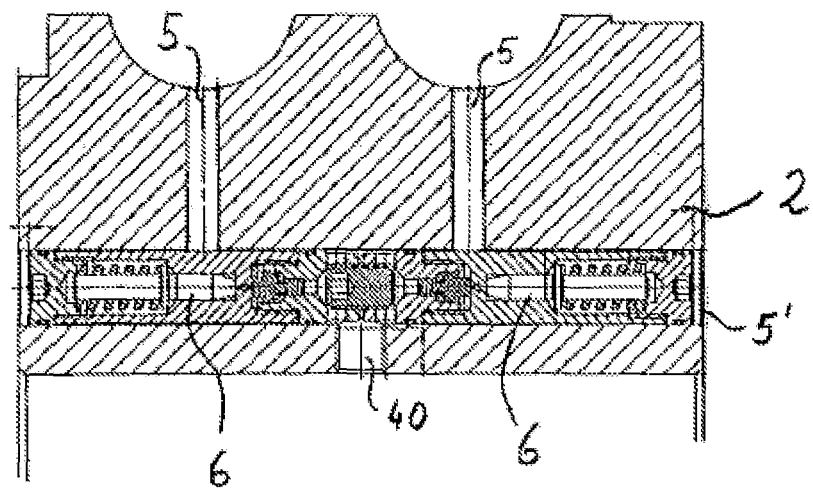
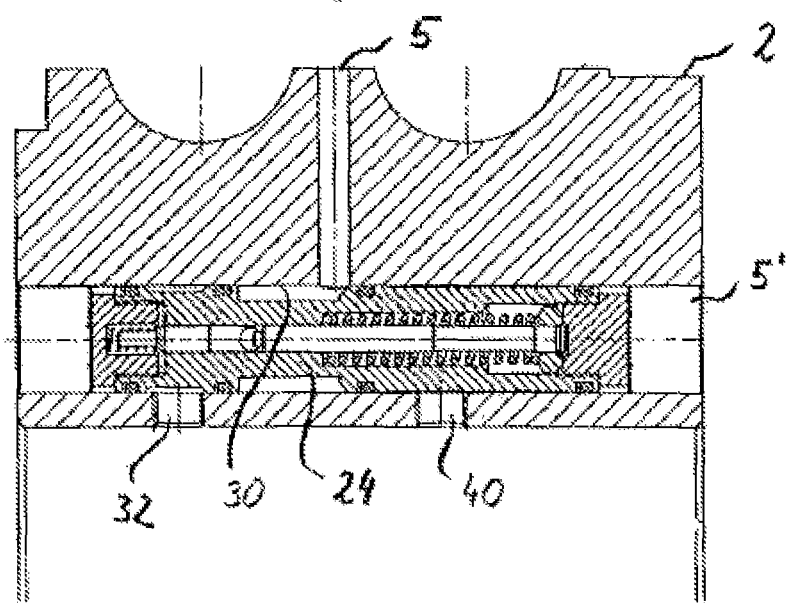

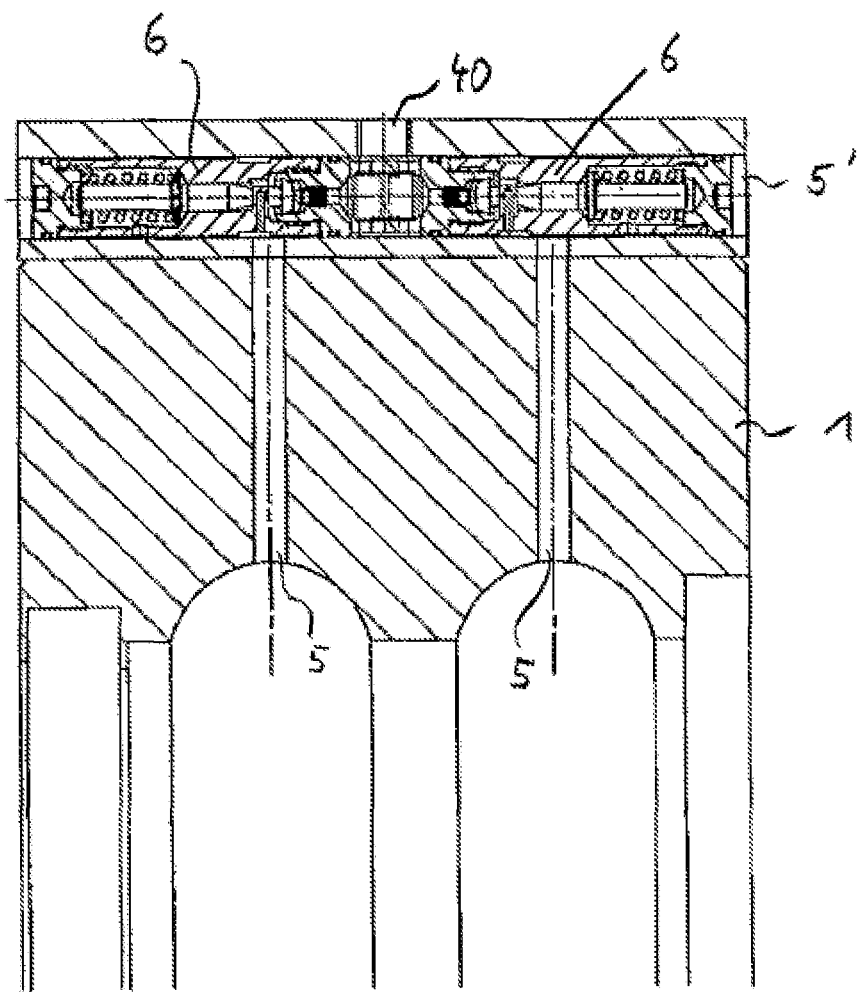

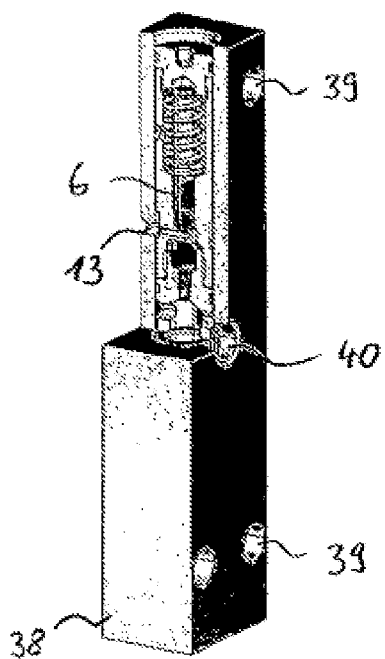
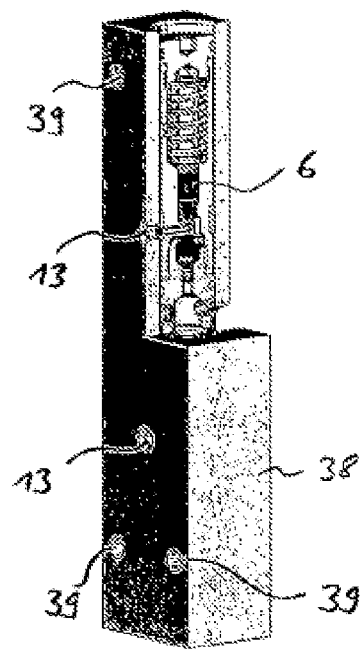
Fig. 11a  Fig. 11b
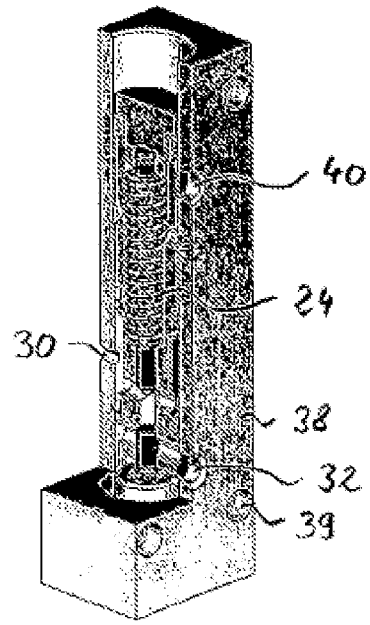
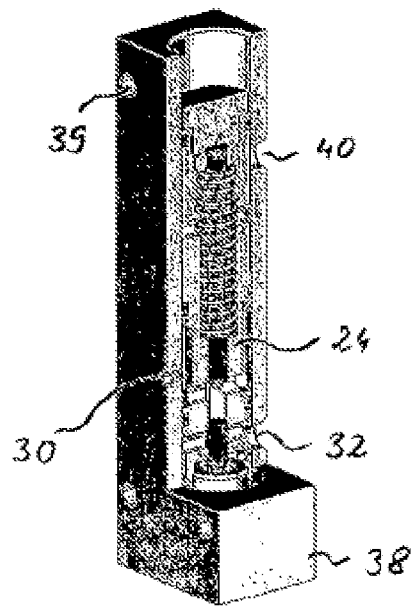
Fig. 12a  Fig. 12b

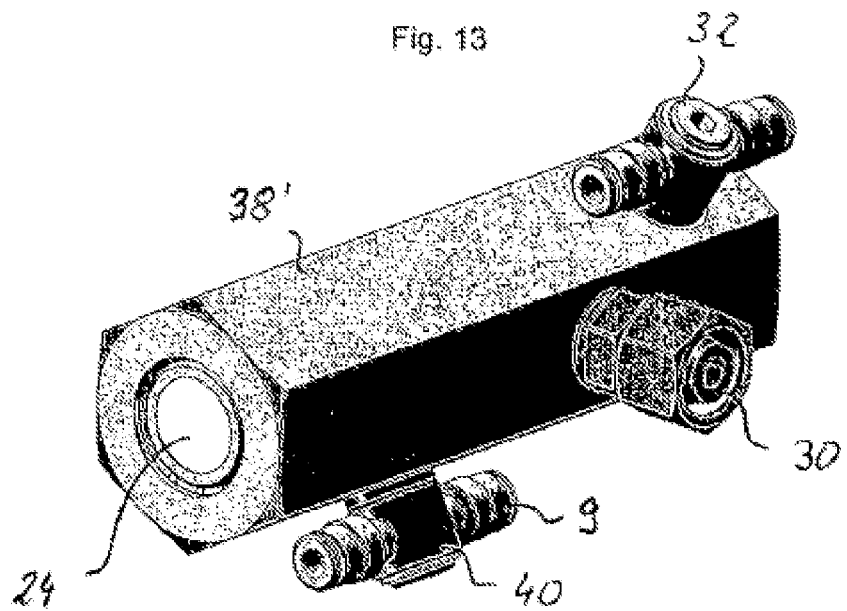
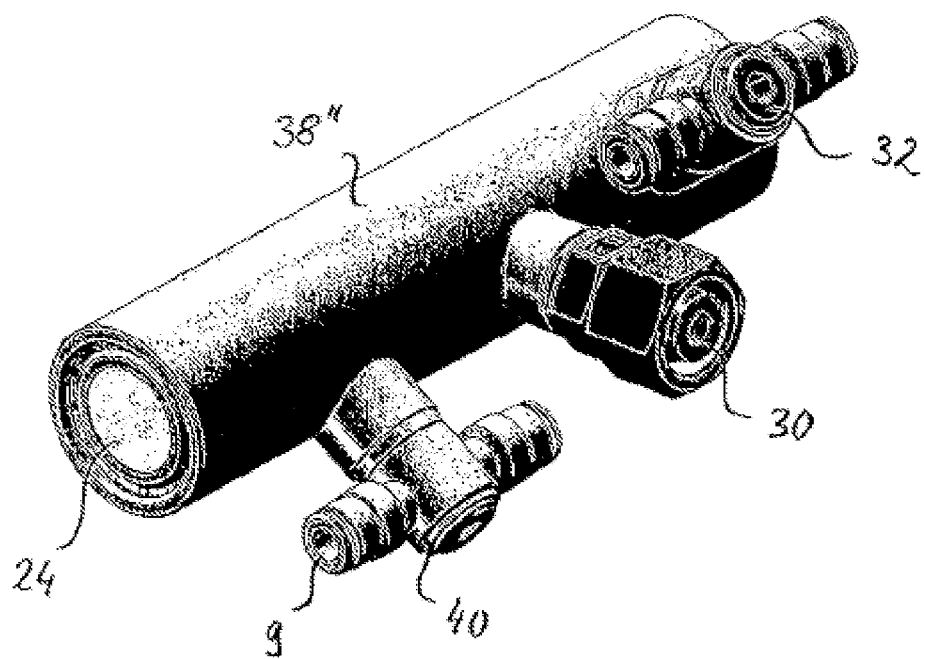

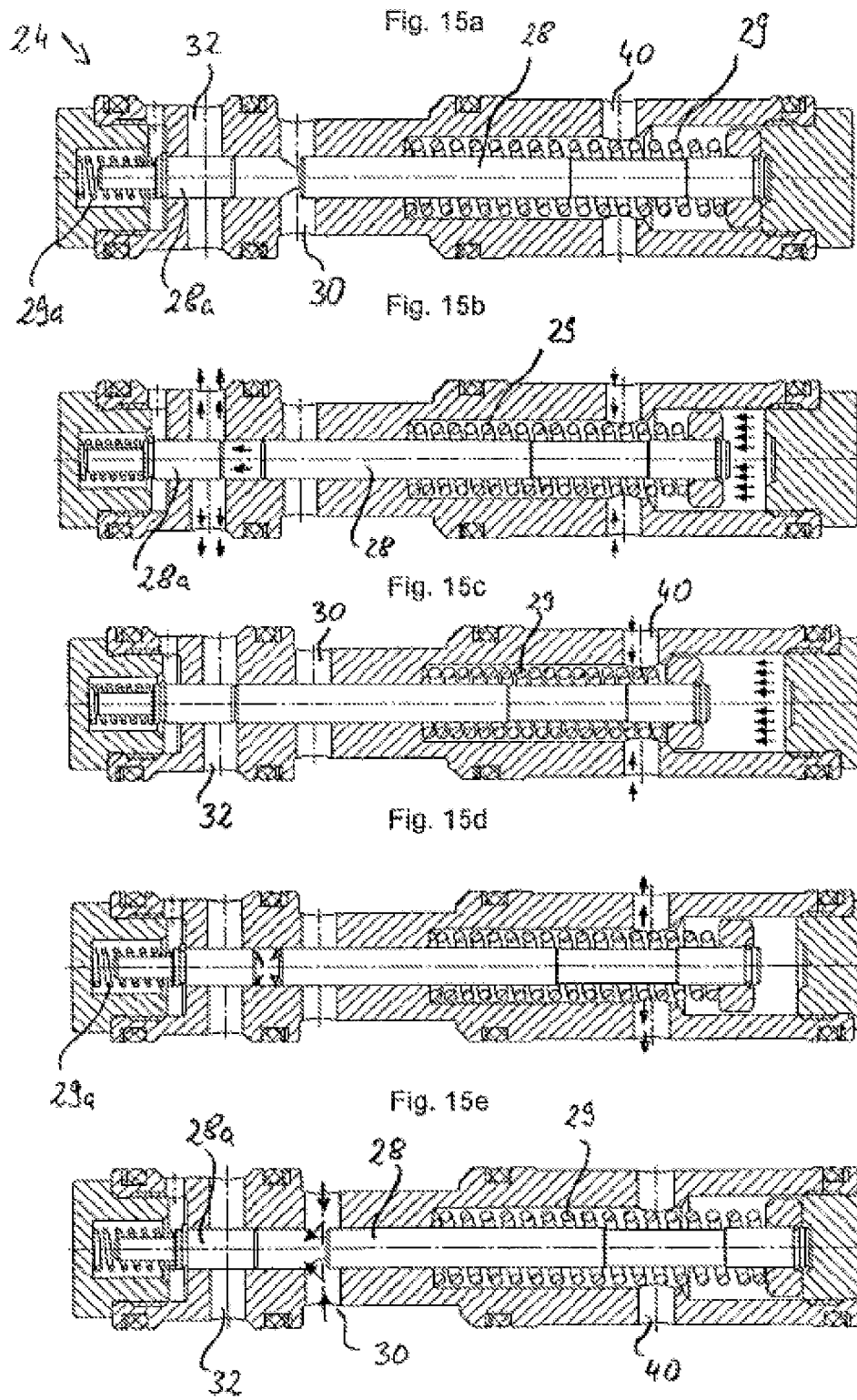

BEARING ARRANGEMENT AND METERING VALVE AND SUCTION DEVICE THEREFOR

BACKGROUND OF THE INVENTION

The invention relates to a bearing arrangement which includes an outer ring and an inner ring which can rotate relative to one another, and rolling bodies, especially balls, which are located between the outer ring and the inner ring. The invention also relates to an infeed distributor and to a suction exhaust device for incorporation in such a bearing arrangement.

Roller bearings of the type mentioned in the introduction are used among other applications for bearings in wind power installations, construction machines or similar devices. In these bearings, a special lubricant supply is often provided to lubricate the rolling bodies. For this purpose, infeed distributors (injectors) are used partially as block distributors with several cells or as individual cell distributors, which are held with a distributor rail. In both variants, the infeed distributors are provided with attachment bores for attachment either to the component to be lubricated or to a holding plate. The lubricant is conveyed from the infeed distributors (injectors) via a lubrication line to the site to be lubricated. This is considered disadvantageous in some application cases because of the construction space required for the infeed distributor. In addition there is the risk a lubrication line may burst, which entails time intensive and labor intensive repair work.

To avoid uncontrolled exit of lubricant from in the bearing arrangements, some plastic bottles are provided, which are screwed into radially oriented ducts to receive exiting lubricant. The regular emptying of these bottles that are sometimes difficult to access is found to be cumbersome. In addition there is the risk of lubricant will exit in an uncontrolled manner from the bearing arrangement if the bottle is not emptied in due time.

The problem of the present invention, in this regard then, is to produce a bearing arrangement of the type mentioned in the introduction, which allows in a particularly space saving and cost saving way the lubrication of, for example, rolling bodies with high operational reliability.

SUMMARY OF THE INVENTION

In one embodiment, this invention is directed to a bearing arrangement comprising an outer ring and an inner ring rotatable with respect to each other, and rolling bodies arranged between the outer ring and the inner ring. The bearing arrangement is characterized by at least one bore in the outer ring and/or in the inner ring connected to at least one metering valve provided in and/or on the inner ring or outer ring and/or to at least one suction device provided in and/or on the inner or outer ring, said at least one suction device being connected to a lubrication supply.

In another embodiment, this invention is directed to a metering valve for the addition by metering of lubricant to a lubrication site, such as a bearing arrangement. The metering valve comprises a lubricant inlet, a lubricant outlet facing the site to be lubricated, and a sleeve between the lubricant inlet and lubricant outlet formed together with an inlet cap as a cartridge insert that can be inserted or screwed into a bore. A sealing piston and a conveyance piston are received in a shiftable way in the sleeve. The sealing piston has a circumferential sealing lip which allows a lubricant to flow past the sealing piston in the conveyance direction and prevents the lubricant from flowing in a direction opposite the conveyance direction. The sealing piston is movable between a position that unblocks a pressure release duct and a position that blocks the pressure release duct. The conveyance piston can be shifted against the force of an elastic element to convey lubricant in the conveyance direction to the site to be lubricated and to suck lubricant in a direction opposite the conveyance direction by the force of the elastic element.

In another embodiment, this invention is directed to a combination of at least one metering valve for the addition by metering of lubricant to a bearing arrangement and at least one suction device. The suction device comprises a lubricant inlet and a lubricant outlet, and a sleeve between the lubricant inlet and lubricant outlet configured as a cartridge insert to be inserted or screwed into a bore. A first piston is received in a shiftable way in the sleeve such that the first piston, in a first movement direction, sucks lubricant from the lubricant inlet into the sleeve, and in a second movement direction opposite the first movement direction, conveys lubricant through the lubricant outlet out of the sleeve. The metering valve and the suction device are connected to each other via a shared lubricant supply for the feeding of pressurized lubricant in such a way that the first piston of the suction device can be shifted by the pressurized lubricant of the lubricant supply against the force of an elastic element in one of the two first and second movement directions and by the force of the elastic element in the other of the two movement directions.

The invention is explained in greater detail below using embodiments examples and with reference to the drawing. Here all the described and/or pictorially represented characteristics, taken alone or in any combination, constitute the object of the invention, independently of their summary in the claims or their interrelationship.

BRIEF DESCRIPTION OF THE DRAWINGS

FIG. 8 is a cross-sectional view of a bearing arrangement according to a fourth embodiment of the invention with two infeed distributors;

FIG. 9 is a cross-sectional view of a bearing arrangement according to a fifth embodiment of the invention with a suction device;

FIG. 10 is a cross-sectional view of a bearing arrangement according to a sixth embodiment of the invention with two infeed distributors;

FIG. 11a is a perspective view of an infeed distributor according to a seventh embodiment of the invention;

FIG. 11b is a perspective view of the infeed distributor according to FIG. 11a seen from the back;

FIG. 12a is a perspective view of a suction device according to an eighth embodiment of the invention;

FIG. 12b is a perspective view of the suction device according to FIG. 12a seen from the back;

FIG. 13 is a perspective view of a suction device according to a ninth embodiment of the invention;

FIG. 14 is a perspective view of a suction device according to an additional embodiment of the invention;

FIGS. 15a-e is a cross-sectional view of a suction device according to an additional embodiment of the invention.

DETAILED DESCRIPTION

In FIGS. 1-3 and 7, a bearing arrangement is shown, as can be used, for example, for wind power installations or large construction machines. The bearing arrangement comprises an outer ring 1 and an inner ring 2, between which rolling bodies comprising balls 3 are provided in running tracks, so that the outer ring 1 can be rotated relative to the inner ring 2. In the two-row bearing arrangement represented in FIG. 1, each ball is retained in a cage 4.

Figure 1:
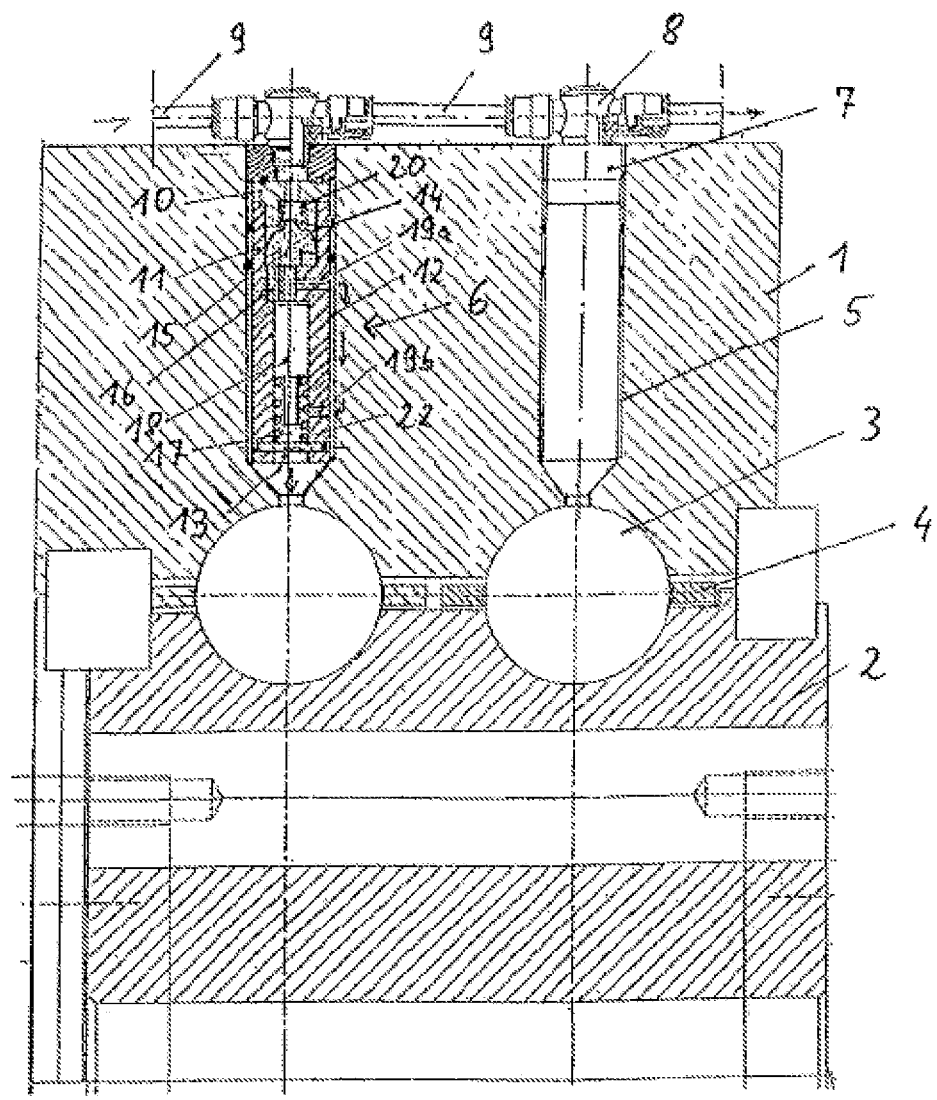
FIG. 1 is a cross-sectional view of a bearing arrangement according to the invention with an infeed distributor.

Several bores 5 extend in a radial direction through the outer ring 1 and open into the running tracks of the balls 3. In FIG. 1, a metering valve designed in the represented embodiment as an infeed distributor (injector) 6 is received as a cartridge insert in the bore 5. On the side that is at the top and on the outside in the figures, each of the bores 5 is closed by an adapter 7. The adapter 7 is screwed into a threaded section of the bore and fixes the infeed distributor 6 as a cartridge insert in the bore. Furthermore, the adapter 7 is connected to a T-piece 8, which is connected to lines 9 for the infeed of a lubricant from a lubrication reservoir container, not shown.

The infeed distributor 6 is essentially formed by an inlet cap 10 and a sleeve 11, which together form the cartridge insert. In this embodiment, the external diameter of the cartridge insert is smaller than the external diameter of the adapter 7, so that the cartridge insert can be introduced easily into the bore 5. At the same time, an annular space 12 is defined between the internal wall of the bore 5 and the external wall of the cartridge insert 6. O-rings 23 function to seal and center the metering valve in the bore 5 The o-rings 23 thus produce a largely constant width of the annular space 12.

The adapter 7 and the inlet cap 10 have central openings which define a lubricant inlet in communication with the lubricant outlet 13 facing the rolling bodies 3 to be lubricated by means of two ducts. As is also evident from the enlarged representation of FIGS. 2 and 3, the lubricant inlet opens first into an upper cylinder space 14 in which a sealing piston 15, which works as a reversing valve, is received in a shiftable way. An axial duct 16 leads from the upper cylinder space 14 into a cylinder space 17, at the bottom in the figures, which opens into the lubricant outlet 13. A conveyance piston 18 is received in a shiftable way in the lower cylinder space 17. In addition, a reversing or pressure release duct 19 branches off from the upper cylinder space 14. The duct 19 includes an upper section 19a which opens from the upper cylinder space 14 into the annular space 12 between the bore 5 and the infeed distributor, and a lower section 19b which opens from the space 12 into the lower cylinder space 17.

The sealing piston 15 is urged downward in the figure by means of a spring 20, so that the sealing piston 15 is pressed against the upper section 19a of the pressure release duct to block it. Moreover, the sealing piston 15 is provided with a circumferential sealing lip 21 which allows the lubricant to flow into the upper cylinder space 14 in the conveyance direction, i.e., downward in the figure, while preventing flow of the lubricant back in the opposite direction. The conveyance piston 18 is received in a sealing way in the lower cylinder space 17, so that no lubricant can flow through the lower cylinder space 17 past the conveyance piston 18. A spring 22 urges the conveyance piston 18 upward in the figures opposite the conveyance direction of the lubricant.

Figure 2:
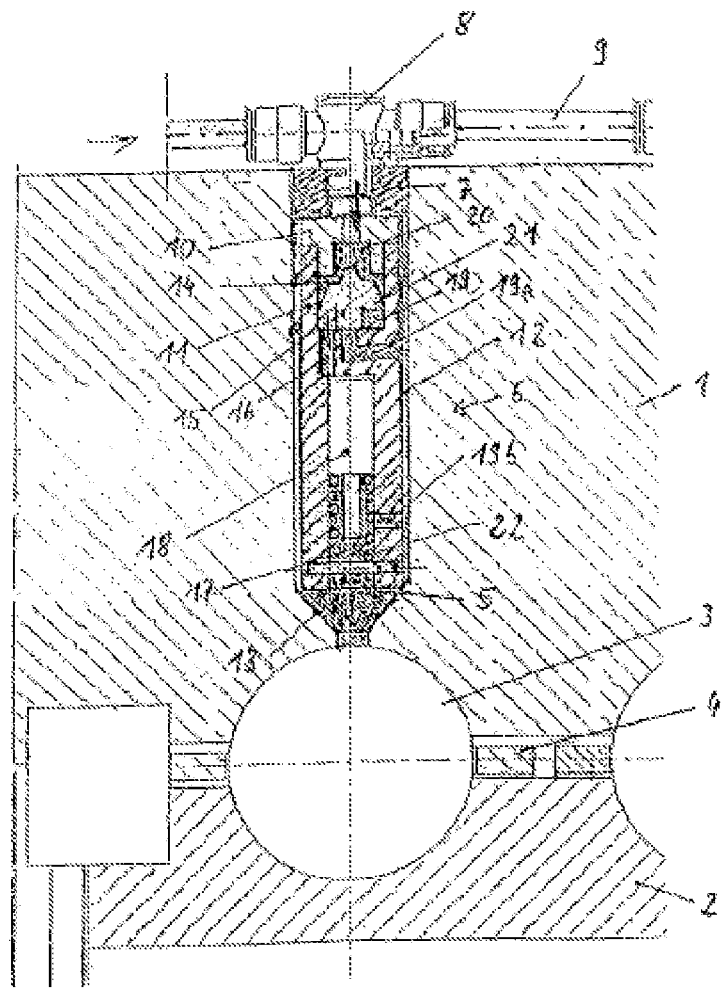
FIG. 2 is an enlarged cross section of the infeed distributor according to FIG. 1 in the pressure phase.

In the pressure phase represented in FIG. 2, a lubricant is pushed through the line 9 and the T-piece 8 into the lubricant inlet of the cartridge insert. As a result, the sealing piston 15 is pressed firmly against the upper section 19a of the pressure release duct, closing it. At the same time, lubricant can flow past the sealing lip 21 which is deformed by the pressure of the lubricant. The lubricant reaches the lower cylinder space 17 via the axial duct 16 and moves the conveyance piston 18 against the pressure of the spring 22 in the conveyance direction. As a result, lubricant in the lower area of the lower cylinder space 17 is conveyed through the lubricant outlet 13 to the site to be lubricated.

Figure 3:
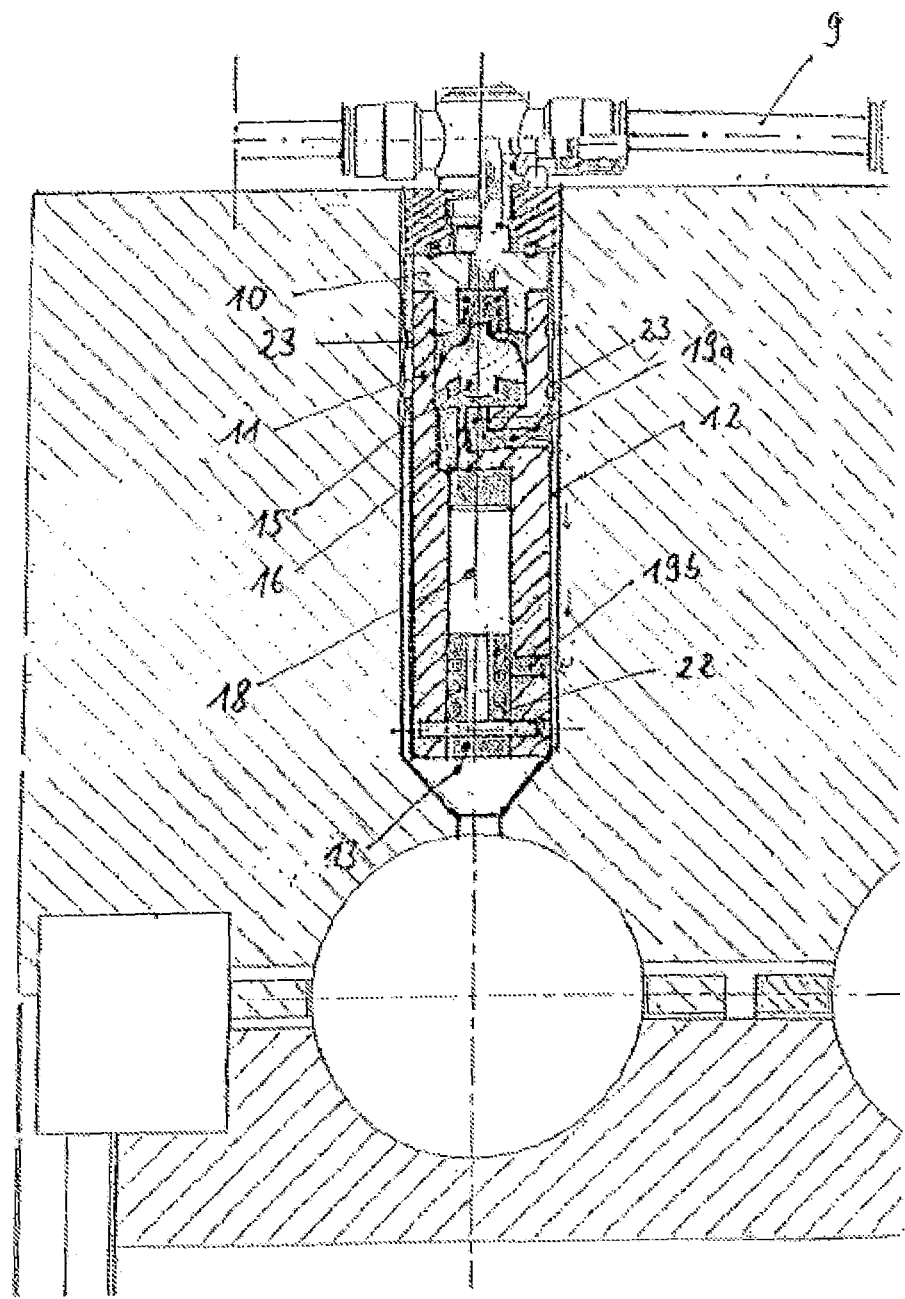
FIG. 3 is an enlarged cross section of the infeed distributor according to FIG. 1 in the pressure release phase.

In the pressure release phase shown in FIG. 3, no additional lubricant is fed through the line 9. The sealing piston 15 is urged only by the force of the spring 22 against the upper section 19a of the pressure release duct. The spring 22, which is compressed by the pressure phase, is designed in such a way that in the pressure release phase, the conveyance piston 18 can be shifted upward in the figure. As a result, the lubricant above the conveyance piston 18 in the lower cylinder space 17 is pressed through the axial duct 16 into the upper cylinder space 14. However, the lubricant cannot pass the sealing lip 21 of the sealing piston 15, raising the latter against the force of the spring 20 away from the upper section 19a of the pressure release duct. The lubricant can thus flow through the upper section 19a of the pressure release duct into the annular space 12, and from there through the lower section 19b of the pressure release duct to the lower side of the lower cylinder space 17.

Once the conveyance piston 18 has reached its upper final position shown in FIG. 2, then, in a new pressure phase, the lubricant can be conveyed out of the lower area of the lower cylinder space 17 by the conveyance piston to the lubricant outlet 13.

Figure 7:
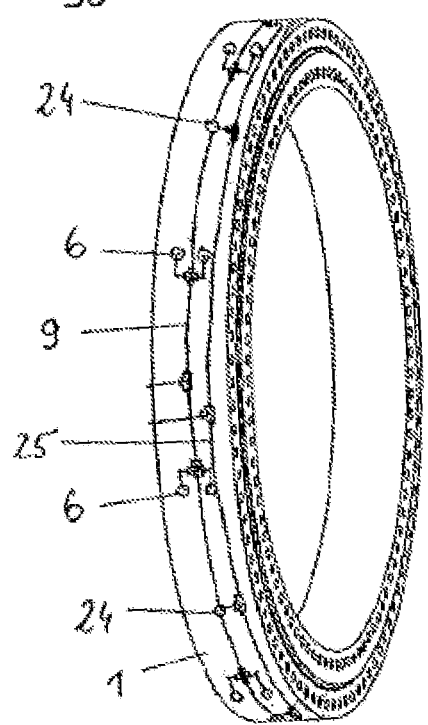
FIG. 7 is a perspective view of a bearing arrangement according to the invention with infeed distributors and suction devices.

To receive the lubricant that has been introduced from the infeed distributor 6 in the bearing arrangement, and to lead it to a collection container (not shown), suction devices 24 may be provided as shown in FIG. 7. FIG. 7 shows a two-row bearing arrangement in which each row of rolling bodies 3 is associated with several infeed distributors 6 connected via a shared line 9 to a pump (not shown) for feeding the pressurized lubricant. Suction devices are provided in the intervening space between the rows of rolling bodies 3 of the bearing arrangement. In FIG. 7, a suction device 24 is provided in the circumferential direction between every two pairs of infeed distributors 6. As described in greater detail below, the suction devices 24 are also connected to the line 9. Furthermore, the suction devices 24 are connected to one another via a recirculation line 25, which leads to a lubricant collection container not shown in the figure. From the latter, the lubricant can optionally be conveyed via a pump back into the line 9.

Figure 4:
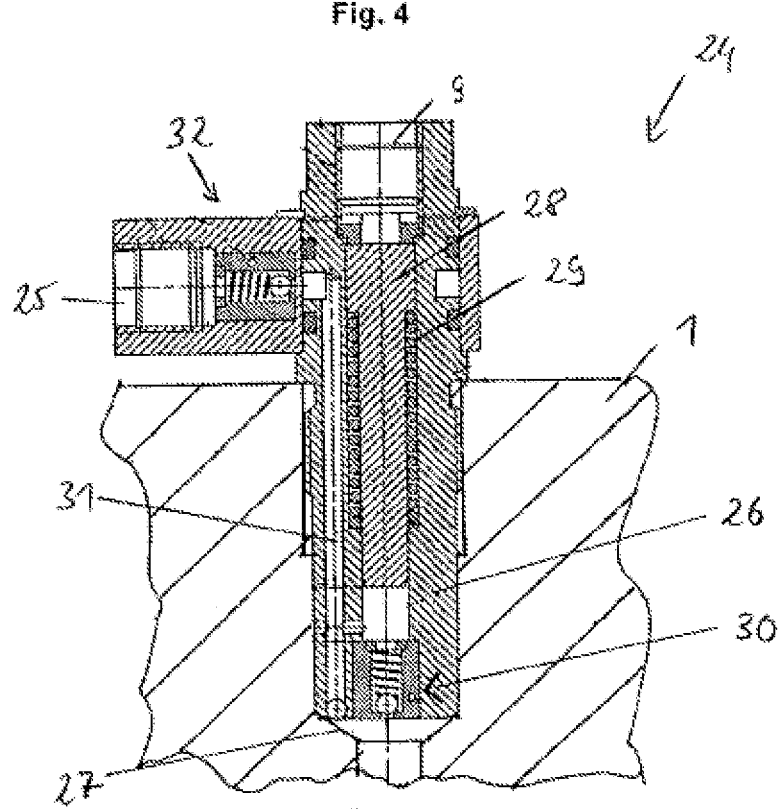
FIG. 4 is a cross-sectional view of a suction device according to a first embodiment of the invention.

FIG. 4 shows details of a first embodiment of a suction device 24. The suction device 24 is essentially formed from a sleeve 26 which is screwed into an additional bore 27 in the bearing arrangement. A piston 28 is received in a shiftable way in the sleeve 26 as a cartridge insert. The piston 28 is urged upward in the figure by a spring 29.

A connection is provided on the upper side of the sleeve 26 in FIG. 4 to connect device 24 to the line 9. On the opposite, lower side, a lubricant inlet 30 is provided to suck lubricant from the bearing arrangement. In the depicted embodiment, the inlet 30 is formed by a check valve. In the sleeve 26, an outlet duct 31 is provided in flow communication with the internal space of the sleeve 26, in which the piston 28 can be shifted. The outlet duct 31 opens into a lubricant outlet 32, which, in the depicted embodiment, is also formed by a check valve. The lubricant outlet 32 is in flow communication with the recirculation line 25.

When pressure is applied to the line 9, lubricant flows in the sleeve 26 of the suction device 24 and pushes the piston 28 against the force of the spring 29 (downward in FIG. 7). As a result, lubricant is conveyed out of the inner space of the sleeve 26 through the outlet duct 31 and the lubricant outlet 32 into the recirculation line 25, wherein the check valve of the lubricant outlet 32 opens and the check valve of the lubricant inlet 30 closes.

If pressure is again released from the line 9, the spring 29 pushes the piston 28 upward in FIG. 7, so that a vacuum is generated in the internal space of the sleeve 26. The check valve of the lubricant outlet 32 closes, and the check valve of the inlet 30 opens, suctioning lubricant out of the bearing arrangement. In this way, the lubricant can be conveyed out of the bearing arrangement, for example, into a collection container, from which lubricant can again be fed via the infeed distributor 6 of the bearing arrangement.

Figure 5:
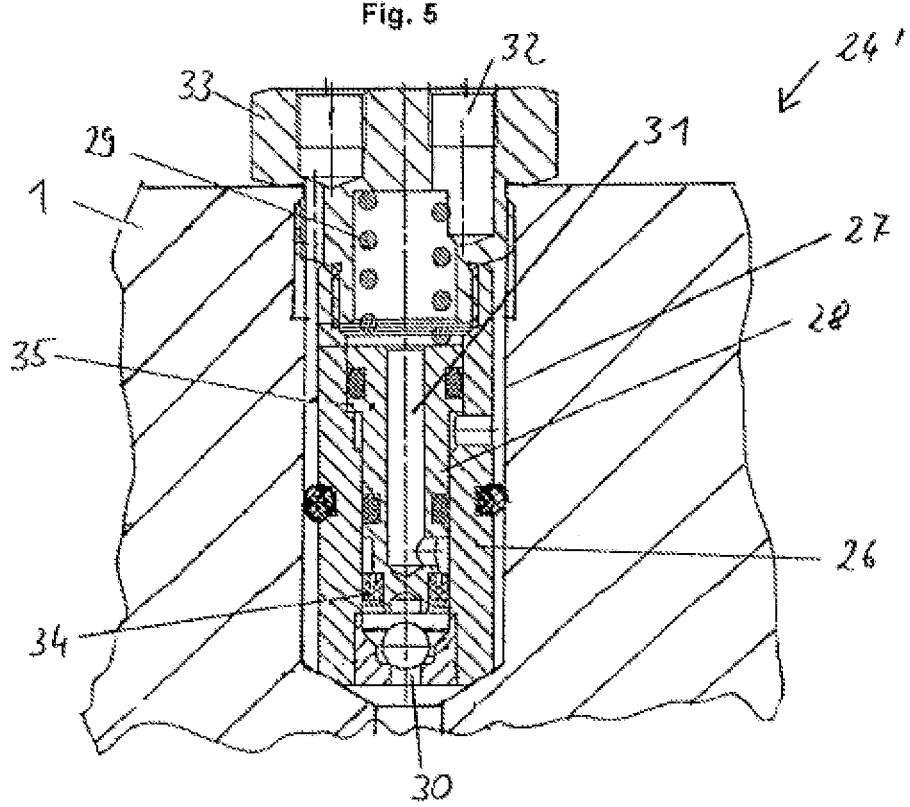
FIG. 5 is a cross-sectional view of a suction device according to a second embodiment of the invention.

In FIG. 5, a second embodiment of a suction device 24' is represented The device 24' is again formed from a sleeve 26, which is inserted in a bore 27 of the bearing arrangement. A piston 28 is received in a shiftable way in the sleeve 26. The piston is designed as a differential piston and is urged downward in the figure by a spring 29. The sleeve 26 is fixed by an adapter 33, which is screwed into the bore 27 in the bearing arrangement.

The piston 28 has a central bore that functions as an outlet duct 31 in communication with the lubricant outlet 32 provided in the adapter 33. A direct flow connection between the lubricant inlet 30, formed by a check valve at the lower end of the sleeve 26 and the outlet duct 31 in the piston 28, is blocked in the unloaded state by a ring in a groove 34 at the lower end of the piston 28. On the left side of the adapter 33 in FIG. 5, a connection for connecting with the line 9 is provided, so that a pressurized lubricant can flow out of the line 9 into an annular space 35 between the wall of the bore 27 and the external surface of the sleeve 26. Lubricant can flow inward through a cross bore in the sleeve 26 and, as a result, move the piston 28 against the force of the spring 29 (upward in the figure). As a result, the check valve of the lubricant inlet 30 is opened, and lubricant is sucked out of the bearing arrangement into the interior of the sleeve 26. Because the ring in the groove 34 seals against the internal wall of the sleeve 26, lubricant in the interior of the piston 28 is conveyed through the lubricant outlet 32 into the recirculation line 25.

If the pressure in the line 9 decreases, the piston 28 is pressed downward by the spring 29 in the figure. As a result, the check valve of the lubricant inlet 30 closes, whereby lubricant can flow past the ring in the groove 34 into the bore 31 in the piston 28. In the position of the piston 28 shown in FIG. 5, a new cycle can then start again for the suction of lubricant, by applying pressure to the line 9.

Figure 6:
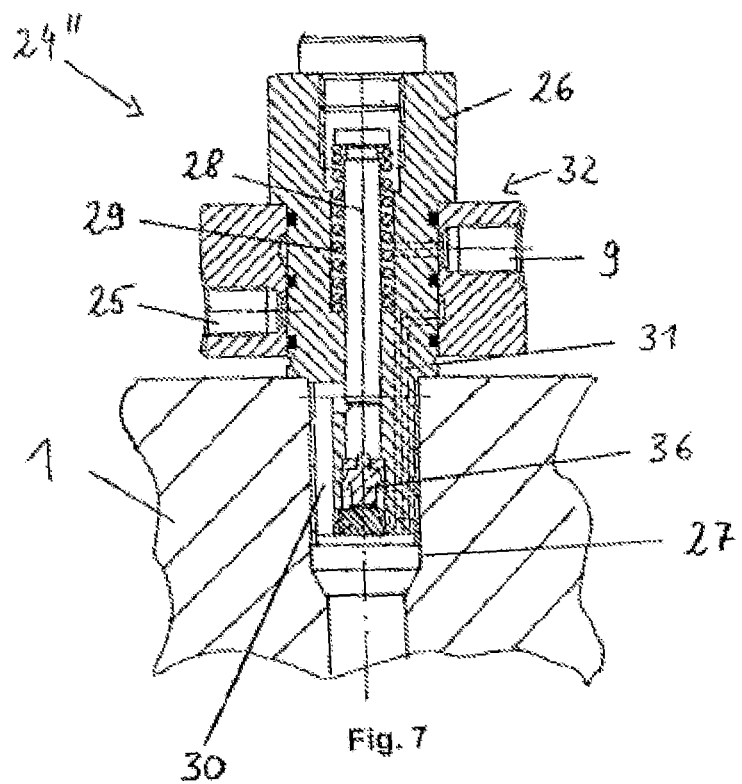
FIG. 6 is a cross-sectional view of a suction device according to a third embodiment of the invention.

In FIG. 6, an additional embodiment of the suction device 24" is represented. As in the above-described embodiments, a sleeve 26 is again inserted and secured in an appropriate way in a bore 27 in the bearing arrangement. A piston 28 is received in a shiftable way in the interior of the sleeve 26. Pressure is applied to the piston 28 in an upward direction by a spring 29. By means of a connector that can be connected to the line 9, pressurized lubricant can be fed into the upper area of the sleeve 26, so that the piston 28 can be moved downward against the force of the spring 29.

The lower area of the internal space of the sleeve 26 is sealed via a check valve 36 with respect to the outlet duct 31 that runs in the wall of the sleeve 26. In FIG. 6, the duct 31 is represented by a broken line and opens into a lubricant outlet 32. Furthermore, in the embodiment represented in FIG. 6, on the left side of the sleeve 26, a bypass duct forms the lubricant inlet 30 which is connected by a cross bore to the internal space of the sleeve 26.

If the piston 28 is moved downward in the figure by the pressure of the lubricant, the cross bore of the lubricant inlet 30 is closed by the piston 28, so that lubricant taken up in the lower area of the sleeve 26 is compressed. As a result, the check valve 36 opens, and the lubricant can then be conveyed via the outlet duct 31 to the lubricant outlet 32 and into the recirculation line 25.

If the pressure in the line 9 drops, the piston 28 is shifted again upward in the figure by the force of the spring 29. The check valve 36 closes again due to the vacuum generated in the sleeve 26, and as soon as the piston 28 passes the cross bore of the lubricant inlet 30, the lubricant is sucked out of the bearing arrangement into the internal space of the sleeve 26. A new cycle for suction and exit of lubricant from the bearing arrangement can then start.

In FIG. 8, an additional embodiment of the invention is represented, in which, as described above with reference to FIG. 1, radial bores 5 are provided which open into the running tracks of the balls. An additional bore 5', which extends in the axial direction of the bearing arrangement, is provided in the inner ring 2. In the additional bore 5', two infeed distributors (injectors) 6 are provided, and they are coupled in such a way that each infeed distributor is connected via its lubricant outlet 13 with the corresponding radial bore 5. A shared lubricant inlet 40 for both infeed distributors 6 is provided on the radially internal side of the inner ring 2. The lubricant feed can thus occur via a hollow shaft or similar part.

In this embodiment, the two infeed distributors 6 can also be provided in a very small radial construction space in the inner ring 2 of a bearing. In the same way, it is possible to provide also in the outer ring 1 an axial bore 5' additionally or as an alternative to the bore 5' in the inner ring 2.

FIG. 9 shows an embodiment similar to FIG. 8 in which a suction device 24 is received in an axially running bore 5' in the inner ring 2. The suction device 24 has a lubricant inlet 30 in communication with the radial bore 5 which opens in the space between the running tracks of the rolling bodies of the bearing arrangement. As explained above with reference to FIGS. 4-6, the suction device 24 has a lubricant outlet 32 that can be connected to a collection line, as well as to a connector for connection to the line 9 (not shown in the figure) for feeding the fresh lubricant to which pressure can be applied.

As already explained above with reference to FIG. 8, it is also possible, alternatively to the embodiment shown in FIG. 9, to provide the axially running bores 5' in the outer ring 1 instead of in the inner ring 2. Furthermore, embodiments in which axial bores 5' are provided both in the outer ring 1 and also in the inner ring 2 are also considered advantageous embodiments.

FIG. 10 represents an additional embodiment of the invention in which radial outer bores 5 are provided in the outer ring 1. The bores 5 open into the running tracks of the balls 3 of the bearing arrangement. However, neither injectors nor suction devices are arranged in these bores 5. A mounting ring 37 is provided on the external side of the outer ring 1. The ring 37 has radial bores which can be made to overlap with the bores 5 in the outer ring 1. Moreover, the mounting ring 37 is provided with an axially running bore 5', so that, as explained above with reference to FIG. 8, two infeed distributors 6 can be received in the mounting ring 37 without any noteworthy enlargement of the radial construction space. In this way, even existing bearings can be retrofitted with a lubricant supply with minimal effort. As explained above, instead of the two infeed distributors 6 in the axial bore 51 as shown in the embodiment according to FIG. 10, only a single infeed distributor 6 and/or a suction device 24 is/can be provided. Furthermore, it is possible to provide a mounting ring 37 not on the external side of the outer ring 1, but on the internal side of the inner ring 2.

The object of the invention, independently of the above-described embodiment, also is a bearing arrangement, in which separate housings are provided to receive at least one infeed distributor 6 (injector) and/or a suction device 24. Alternatively to the above described embodiment with at least one mounting ring 37, a housing can be provided on the front side of the outer ring 1 and/or of the inner ring 2. With an appropriate design of the housing, the latter can optionally also be provided as an alternative to the mounting ring 37 on the external surface of the outer ring 1 or on the internal surface of the inner ring 2.

With reference to FIGS. 11a, and 11b, an additional embodiment of the invention is described in which two mutually coupled infeed distributors 6 (injectors) are arranged in a shared housing 38 in such a way that they can be connected via a shared connector to the line 9 (not shown). The housing 38 can be firmly screwed on the bearing arrangement, like a flange connection. For this purpose, several attachment bores 39 are provided in the housing. As shown in FIG. 11a, on the side turned away from the bearing arrangement, an inlet 40 for connection with the lubricant line 9 is provided for supplying fresh lubricant to both infeed distributors 6. On the side facing the bearing arrangement, as shown in FIG. 11b, a lubricant outlet 13 is provided for each infeed distributor 6. The outlet 13 can be connected to the bores 5 or 5' in such a way that fresh lubricant can be fed to the running tracks of the balls of the bearing arrangement. The infeed distributors 6 can be received as cartridge inserts in the housing 38, so that they can be replaced rapidly if necessary.

In FIGS. 12a and 12b, an embodiment similar to the embodiment according to FIGS. 11a and 11b is represented. In this embodiment, a suction device 24 is accommodated in a cuboid housing 38. On the side of the housing 38 that is turned away from the bearing arrangement, the connector 40 for feeding fresh lubricant and the lubricant outlet 32 are provided for connection to a collection line. On the other hand, on the side of the housing 38 that faces the bearing arrangement, a lubricant inlet 30 is arranged, which can be connected with an appropriate bore for the suction of old lubricant out of the bearing arrangement. The suction device 24 is also accommodated in a replaceable way as cartridge insert in the housing 38.

In FIGS. 13 and 14, additional embodiments of separate housings 38' and 38", respectively, are represented. These housings are provided for incorporation in a suction device 24, whose detail is not shown, or alternatively for reception of an infeed distributor 6 (not shown in the figures). In the embodiment of FIG. 13, the housing 38' is made of aluminum, for example, and has an external contour that is hexagonal in cross section. The housing 38' has a central inner bore for receiving the suction device 24. A lubricant inlet 30 is provided on the external side of the housing 38' for connection to a suction line leading to the bearing arrangement. Also provided on the external side of the housing 38' are a lubricant outlet 32, which, via a T-piece, releases the sucked lubricant to a collection line, and a connector 40 which is also designed as a T-piece for connection to the line 9 to supply fresh lubricant to drive the suction device 24.

In the embodiment according to FIG. 14, the housing 38" is designed, for example, as a steel pipe with soldered connecting branches. A suction device 24, not represented in further detail, is accommodated inside the housing 38". Alternatively, infeed distributors 6 can also be provided in the housing 38". As explained above with reference to FIG. 13, in the embodiment according to FIG. 14 as well, the connecting branches form a lubricant inlet 30, a lubricant outlet 32, and a connection 40 for the line 9.

In the embodiments according to FIGS. 13 and 14, a suction device 24 or an injector can also be applied externally at a bearing site, if incorporation in a bearing unit is not possible for space reasons, or if the expense for the integration in a bearing is too high. The attachment of the housing 38' or 38" can also occur by means of screws. Alternatively or additionally in the case of strong vibrations occurring during operation, it is also possible to provide additional attachment possibilities, such as, for example, clamps.

Functioning of a suction device 24 according to a preferred embodiment of the invention is explained below with reference to FIGS. 15a-15e. In the rest position according to FIG. 15a, the main line is pressure-released, so that the piston 28 is urged into its starting position by the spring 29 pressing against a washer on the piston (shown on the right end of the piston in the figures). An additional piston 28a is pushed by an additional spring 29a toward its starting position, in which the lubricant outlet 32 is closed. The chambers that receive the springs 29, 29a are here already filled with lubricant from the previous work cycle. If, as indicated in FIG. 15b, pressure (e.g., 37 bar) is applied to the main line 9, then fluid enters into the chamber of the spring 29, shifting the washer and the piston 28 to the left against the force of the spring. As a result, the piston 28 closes the lubricant inlet 30. The lubricant present between the pistons 28 and 28a, due to the movement of the piston 28, shifts the piston 28a, so that the latter unblocks the lubricant outlet 32, and old lubricant can exit. This process is terminated when the pressure in the main line 9 increases further (for example, to 80 bar) until the washer, as shown in FIG. 15c, pushes against an abutment of the housing. The pistons 28 and 28a come into contact in this process.

After the pressure release from the line 9, the springs 29 and 29a push the pistons 28 and 28a back (to the right in FIG. 15d). In the process, fresh lubricant is recirculated into the line 9. The piston 28a here acts as a check valve, where first a vacuum must be generated between the pistons 28 and 28a. As soon as the piston 28 has been shifted back sufficiently so that the lubricant inlet 30 is opened, the vacuum sucks used lubricant from a bearing (not shown) into the lubricant inlet 30. The suction device is as a result again ready for use in the next work cycle.

Figure 16:
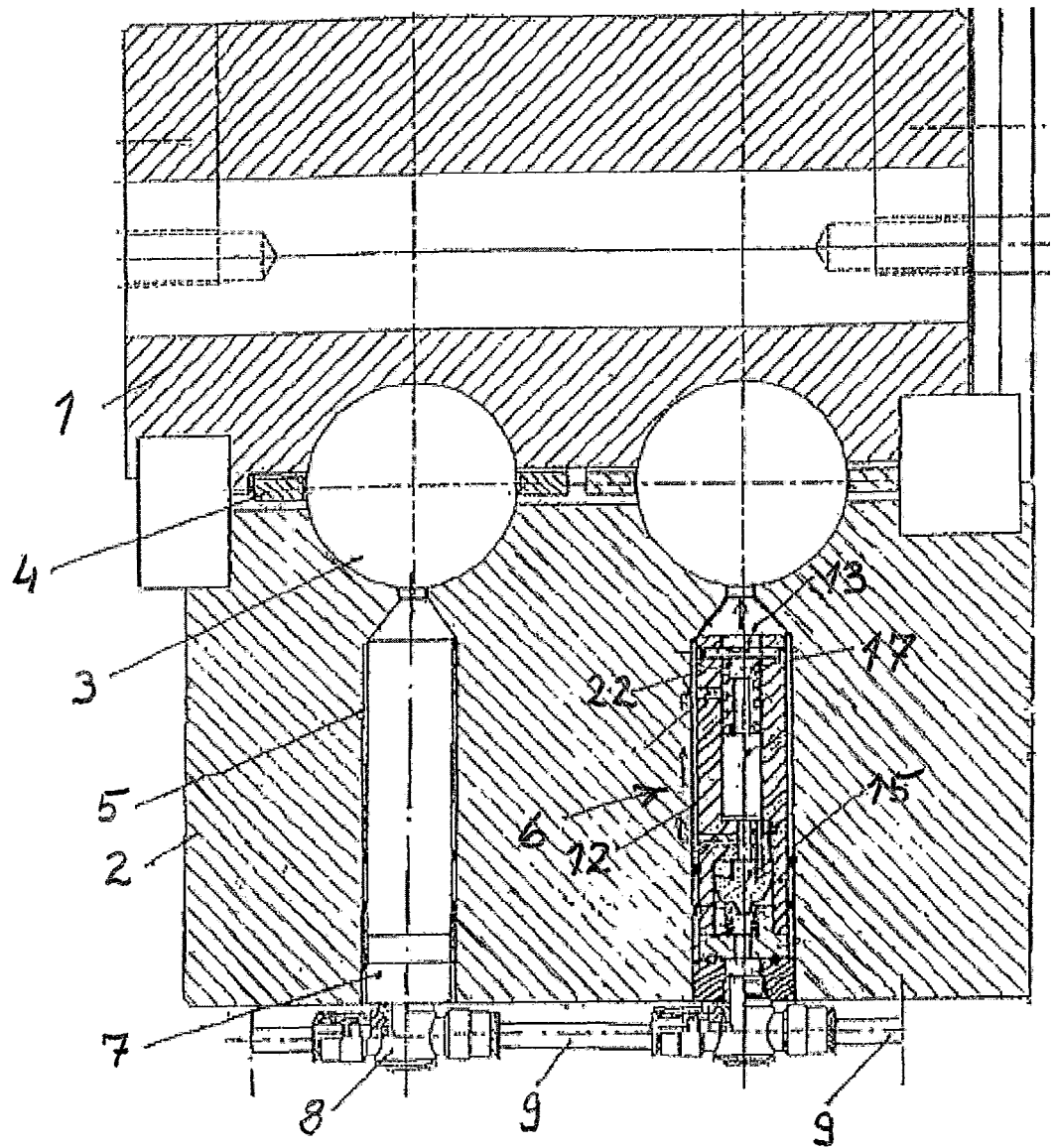
FIG. 16 is a cross-sectional view of a bearing arrangement according to another embodiment of the invention.

It will be observed from the foregoing that this invention solves the problem described in the BACKGROUND OF THE INVENTION above. More specifically, this problem is essentially solved by providing, in one embodiment of this invention, a bearing arrangement in which at least one bore is provided in the outer ring and/or in the inner ring for receiving an infeed distributor or similar metering valve as a cartridge insert, which insert is connected to a lubricant supply. (See e.g., FIG. 1 and 16.) In other words, the metering valve, which may be designed, for example, as an infeed distributor, is designed in such a way that it can be integrated as a cartridge insert in a bore of a component of the bearing arrangement. If the metering valve is directly integrated as a cartridge insert in the outer ring or the inner ring of the bearing arrangement, then no additional construction space is required for the arrangement of block distributors or individual cell distributors. It is precisely in relatively large bearing arrangements, as used, for example, in wind power installations or construction machines, that a space saving arrangement of the metering valves in the bearing arrangement itself is possible. Because, also, distributor rails and similar parts are no longer needed, the arrangement according to the invention of the metering valves as cartridge inserts in the bearing arrangement also entails a clear cost saving. The bore is here designed preferably with a radial orientation; however, an axially oriented bore can also be provided as a function of the conditions of use.

In addition, the operational safety is increased, because the distributor outlet of each metering valve is in direct connection with the site to be lubricated. Because no lubrication line is present, there is no risk of bursting of the lubrication line as a result of the high counter pressure. Moreover, the replacement of metering valves for repair and maintenance purposes is also simplified if the valves are designed as cartridge inserts received in a bore in the outer ring or the inner ring of the bearing arrangement.

In some embodiments, a suction device is received as a cartridge insert in at least one additional bore in the outer ring and/or in the inner ring. The suction device is connected to a lubricant collection container and operates to suck lubricant that is conveyed via the at least one metering valve to the bearing arrangement. The lubricant therefore does not exit in an uncontrolled way from the bearing arrangement, but rather it is conveyed to a collection container from which the lubricant can optionally again be conveyed to the bearing arrangement. Replacement of the collection bottles that were conventionally used in the past, which were provided directly on the bearing arrangement, can be omitted in this embodiment.

The invention here is not limited to the application of single-row ball bearings, but rather the bearing arrangement according to the invention can also be designed as a double- or multiple-row bearing with balls, rollers or similar rolling bodies.

To achieve an optimal lubricant supply and recirculation with the bearing arrangement according to the invention, it is preferred for each rolling body row to be associated with at least one metering valve and/or, in particular, at least one suction device that can be driven by the pressure of the lubricant conveyed to the metering valve, wherein several metering valves or suction devices are connected to one another via a common lubricant supply.

According to a preferred embodiment of the invention, the at least one metering valve or suction device is fixed by means of an adapter that is screwed into at least one bore in the outer ring or the inner ring of the bearing arrangement, and is connected to the lubricant supply. Thus, the adapter, for example, secures the metering valve or suction device, which is inserted, for example, only into one bore, and designed as a cartridge insert, in the outer ring or the inner ring of the bearing arrangement. At the same time, the adapter can also form the connection element, by means of which the metering valve, which is designed, for example, as an infeed distributor (injector), is connected to the lubricant supply. It is preferred for several suction devices to be connected via a common recycling line to a lubricant collection container.

Alternatively to the arrangement of the metering valve or the suction device in a bore of the bearing arrangement, the at least one metering valve and/or the at least one suction device can be secured to the external side of the inner ring or the outer ring in such a way that at least one bore opens into a lubricant outlet of a metering valve or into a lubricant inlet of a suction device. In this embodiment, the at least one metering valve and/or the at least one suction device is preferably flange mounted externally to the inner ring or the outer ring. According to an additional preferred embodiment of the invention, on the radial internal side of the inner ring and/or on the radial external side of the outer ring, at least one mounting ring is arranged, in which at least one bore is provided to receive the metering valve or the suction device.

The bearing arrangement according to the invention can be a component of a construction machine or of a wind power installation. However, it is also possible to use the bearing arrangement according to the invention with infeed distributors designed as cartridge inserts or similar metering valves in motor vehicles or tools.

The problem that is the basis of this invention is solved by a metering valve, designed, for example, as an infeed distributor, for addition by metering of a lubricant at a lubrication site, particularly on a bearing arrangement. The metering valve has a lubricant inlet and a lubricant outlet that faces a site that has to be lubricated. A sleeve is positioned between the inlet and outlet and is designed together with an inlet cap as a cartridge insert to be inserted or screwed into a bore. A sealing piston, operating as a reversing valve, and a conveyance piston are received in a shiftable way in the bore. In one embodiment, the sealing piston presents a circumferential sealing lip, which allows a lubricant to flow through in the conveyance direction and prevents flow back of the lubricant, and which can be shifted between a position that unblocks a reversing or pressure release duct and a position that blocks said duct. The sealing piston can be biased by a spring or a similar elastic element into its position that blocks the pressure release duct. Furthermore, the conveyance piston can be shifted in the conveyance direction against the force of a spring or of another suitable elastic element for the conveyance of lubricant to the site to be lubricated and opposite the conveyance direction to suck lubricant due to the force of the spring or the elastic element.

In the pressure phase, in which lubricant is led through the lubricant inlet to the sealing piston, the lubricant flows past the sealing piston that acts as a reversing valve, which piston is shifted into its position that blocks the reversing or pressure release duct, and as a result the reversing or pressure release duct is hydraulically separated from the inlet area. The lubricant that flows past the elastic sealing lip of the sealing piston applies, in the process, pressure to the conveyance piston, which conveys the lubricant against the force of the spring that is applied to it, to the site to be lubricated.

In the release phase, in which the pressure in the main line drops and as a result no lubricant is conveyed through the lubricant inlet, the spring that is applied to the conveyance piston presses it opposite the conveyance direction. As a result, the sealing piston is moved out of its position that blocks the reversing or pressure release duct into its position that unblocks the pressure release duct. In this way, the lubricant can be rearranged through the pressure release duct from the inlet side of the conveyance piston to the outlet side of the conveyance piston, until the conveyance piston reaches an abutment facing the lubricant inlet. The two pistons of the metering valve then have reached their starting position, to convey, in a new pressure phase, the lubricant arranged on the external side of the conveyance piston to the site to be lubricated.

The design of the metering valve as a cartridge insert in the sense of the present invention means that the latter is designed in a way that the cartridge insert can be integrated in a bore of a component. A distributor (manifold) and/or attachment bores are therefore not needed.

In a preferred embodiment of the invention, the infeed distributor or similar metering device presents an adapter with an external threading for the fixation of the cartridge insert into a threaded bore, wherein the cartridge insert, at least in some areas, has a smaller external diameter than the adapter. In this way, the metering valve that is designed as a cartridge insert can be shifted easily into a bore or similar part, and it can be secured by screwing in the adapter. Alternatively, the cartridge insert itself can be provided at least in some areas with an external threading, in order to be screwed directly, even without an additional adapter, into a threaded bore.

In a refinement of this inventive concept, the pressure release duct runs at least in sections along the external surface of the cartridge insert in a slit formed as a result of the external diameter that is smaller as compared to the adapter. The structure of the cartridge insert as a result becomes particularly simple, because no additional pressure release duct is provided, leading past the conveyance piston through the sleeve. Rather, the lubricant can flow in the pressure release phase in a slit-like annular space between the external side of the sleeve and the internal side of a bore or similar part to the outlet-side end of the conveyance piston. Alternatively or additionally it is also possible for a groove or similar recess or flattening to be formed in the external wall of the sleeve and to then form a part of the pressure release duct. If o-rings or similar centering means are provided on the cartridge insert, then a defined width of the annular slit can be achieved, so that the slit can be used as a part of the pressure release duct.

It is preferred for the lubricant outlet of the metering valve to be connected, without the insertion of a lubrication line, by direct connection to the site to be lubricated. The omission of the lubrication line, which is possible as a result of the design of the metering valve as a cartridge insert, increases the safety, because with lubrication lines there is some risk that they may burst as a result of a high counter pressure.

According to a preferred embodiment of the invention, a combination is provided which consists of at least one metering valve for the addition by metering of a lubricant to a lubrication site and at least one suction device. In this embodiment, the suction device is provided with a lubricant inlet facing the site to be lubricated, and a lubricant outlet. A sleeve is positioned between the inlet and outlet and is designed as a cartridge insert to be inserted or screwed into a bore. A piston is received in the bore in a way so that the piston, in a first movement direction, sucks lubricant out of the lubricant inlet into the sleeve and, in a second movement direction, which is opposite the first movement direction, conveys lubricant through the lubricant outlet out of the sleeve. The metering valve and the suction device are connected to one another via a shared lubricant supply for the conveyance of pressurized lubricant in such a way that the piston of the suction device, via the pressurized lubricant of the lubricant supply, can be shifted against the force of an elastic element in one of the two movement directions and by the force of the elastic element into the other of the two movement directions.

According to a preferred embodiment, the suction device is designed in such a way that, in the sleeve, a cylinder bore is provided, into which the lubricant inlet, the lubricant outlet, and a connection for the lubricant supply open, and in which the first piston as well as an additional piston are received in a shiftable way so that the first piston can be moved by the pressure of the lubricant from the lubricant supply from a position that unblocks the lubricant inlet into a position that closes the lubricant inlet, and wherein the additional piston can be moved by the first piston out of a position that closes the lubricant inlet into a position that unblocks the lubricant outlet.

REFERENCE NUMERAL LIST

1 Outer ring
2 Inner ring
3 Ball
4 Cage
5, 5' Bore
6 Infeed distributor (injector)
7 Adapter
8 T-piece
9 Line
10 Inlet cap
11 Sheet
12 Annular slit
13 Lubricant outlet
14 Upper cylinder space
15 Sealing piston
16 Axial duct
17 Lower cylinder space
18 Conveyance piston
19 Pressure release duct
19a Upper section of the pressure release duct 19
19b Lower section of the pressure release duct 19
22 Spring
21 Sealing lip
22 Spring
23 O-ring
24, 24', 24" Suction device
25 Recirculation line
26 Sleeve
27 Bore
28, 28a Piston
29, 29a Spring
30 Lubricant inlet
31 Outlet duct
32 Lubricant outlet
33 Adapter
34 Ring in a groove
35 Annular slit
36 Check valve
37 Mounting ring
38, 38', 38" Housing
39 Attachment bore
40 Connector for line 9

What is claimed is:

1. A bearing arrangement comprising an outer ring and an inner ring rotatable with respect to each other, rolling bodies arranged between the outer ring and the inner ring, a metering valve received in a metering valve bore in the inner ring or the outer ring, and a suction device received as a cartridge insert in a suction device bore in the inner ring or the outer ring, said suction device being connected to a lubricant supply, and said cartridge insert being connected to a lubricant collection container.

2. A bearing arrangement according to claim 1, wherein the rolling bodies are arranged in one or more rows positioned next to each other between the outer ring and the inner ring.

3. A bearing arrangement according to claim 2, wherein each of said rolling body rows is associated with at least one of the metering valve and the suction device, and wherein a plurality of the metering valves is connected to each other via the lubricant supply or a plurality of the suction devices is connected to each other via the lubricant supply.

4. A bearing arrangement according to claim 1, wherein at least one of the metering valve and the suction device is fixed via an adapter screwed into the corresponding bore, and wherein said adapter is connected to the lubricant supply.

5. A bearing arrangement according to claim 1, wherein the metering valve is attached to the corresponding inner or outer ring in such a way that the metering valve bore opens into a lubricant outlet of the metering valve, and the suction device is attached to the corresponding inner or outer ring in such a way that the suction device bore opens into a lubricant inlet of the suction device.

6. A bearing arrangement according to claim 1, wherein several suction devices are connected via a shared recirculation line to the lubricant collection container.

7. A bearing arrangement according to claim 1, wherein the bearing arrangement is a component of a construction machine or a wind power installation.

* * * * *